US012646997B2

(12) United States Patent
Ariapad et al.

(10) Patent No.: US 12,646,997 B2
(45) Date of Patent: Jun. 2, 2026

(54) INTEGRATED PISTON ASSEMBLY FOR AN ELECTRIC MACHINE

(71) Applicant: Hyliion Holdings Corp, Cedar Park, TX (US)

(72) Inventors: Alex William Ariapad, Cincinnati, OH (US); Joshua Tyler Mook, Cincinnati, OH (US); Aigbedion Akwara, Cincinnati, OH (US)

(73) Assignee: Hyliion Holdings Corp., Cedar Park, TX (US)

( * ) Notice: Subject to any disclaimer, the term of this patent is extended or adjusted under 35 U.S.C. 154(b) by 0 days.

(21) Appl. No.: 18/631,188

(22) Filed: Apr. 10, 2024

(65) Prior Publication Data

US 2025/0323552 A1 Oct. 16, 2025

(51) Int. Cl.
H02K 7/18 (2006.01)
H02K 7/08 (2006.01)
H02K 35/02 (2006.01)

(52) U.S. Cl.
CPC ............. H02K 7/1884 (2013.01); H02K 7/08 (2013.01); H02K 35/02 (2013.01); *H02K 2213/09* (2013.01)

(58) Field of Classification Search
CPC ........ H02K 7/1884; H02K 7/08; H02K 35/02; H02K 2213/09; H02K 7/09
See application file for complete search history.

(56) References Cited

U.S. PATENT DOCUMENTS

| | | | | |
|---|---|---|---|---|
| 9,657,675 | B1 * | 5/2017 | Roelle | F02D 41/1402 |
| 10,711,733 | B1 | 7/2020 | Notarnicola et al. | |
| 10,724,470 | B1 | 7/2020 | Mook et al. | |
| 2008/0271711 | A1 | 11/2008 | Cheeseman | |
| 2012/0125291 | A1 * | 5/2012 | Simpson | F02B 25/08 |
| | | | | 123/46 E |
| 2012/0280513 | A1 | 11/2012 | Cockerill | |
| 2015/0300272 | A1 * | 10/2015 | Pluta | F02B 75/04 |
| | | | | 123/48 R |
| 2020/0195093 | A1 * | 6/2020 | Svrcek | F02B 71/04 |
| 2024/0297553 | A1 * | 9/2024 | Svrcek | H02K 1/12 |

FOREIGN PATENT DOCUMENTS

JP 2008038753 A * 2/2008

OTHER PUBLICATIONS

European Search Report Corresponding to Application No. 25164928 on Sep. 16, 2025.

* cited by examiner

*Primary Examiner* — Syed O Hasan
(74) *Attorney, Agent, or Firm* — Dority & Manning, P.A.

(57) ABSTRACT

A linear electric machine includes a shaft, a primary piston assembly operably coupled with the shaft, a stator assembly supporting the shaft and housing a load device, and a bearing assembly supporting an end of the shaft. The bearing assembly includes a bearing housing and a fluid bearing within the bearing housing. The bearing housing includes an opening for receiving the shaft therethrough. The linear electric machine also includes a secondary piston assembly formed integrally with the shaft and at least a portion of the bearing assembly for providing fluid to the bearing assembly.

14 Claims, 13 Drawing Sheets

INTEGRATED PISTON ASSEMBLY FOR AN ELECTRIC MACHINE

FIELD

The present disclosure relates generally to electric machines, and more particularly to an integrated piston assembly for supplying fluid to a bearing assembly of an electric machine, such as a closed-cycle engine.

BACKGROUND

Large vehicles may be used to efficiently transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

Such vehicles may be designed with unique configurations capable of integrating one of several different types of engines, such as a closed-cycle engine, to generate electric power for charging an array of batteries under a plurality of operating conditions.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
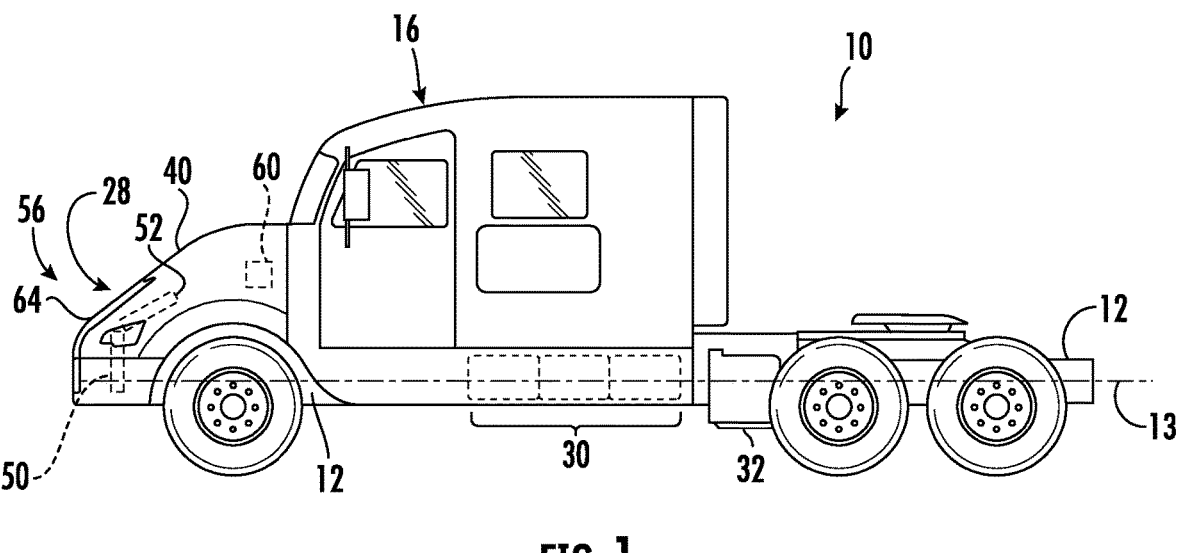
FIG. 1 illustrates a side view of an embodiment of a wheeled vehicle capable of transporting cargo over an extended range according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
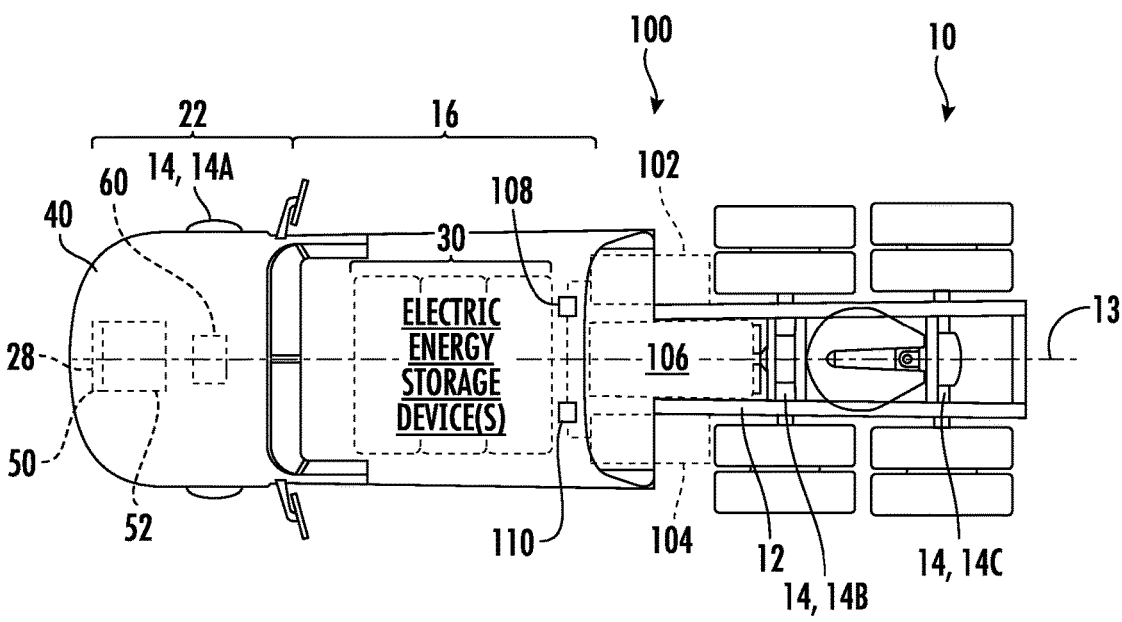
FIG. 2 illustrates a detailed, top view of an embodiment of a wheeled vehicle capable of transporting cargo over an extended range according to the present disclosure.
Figure 3:
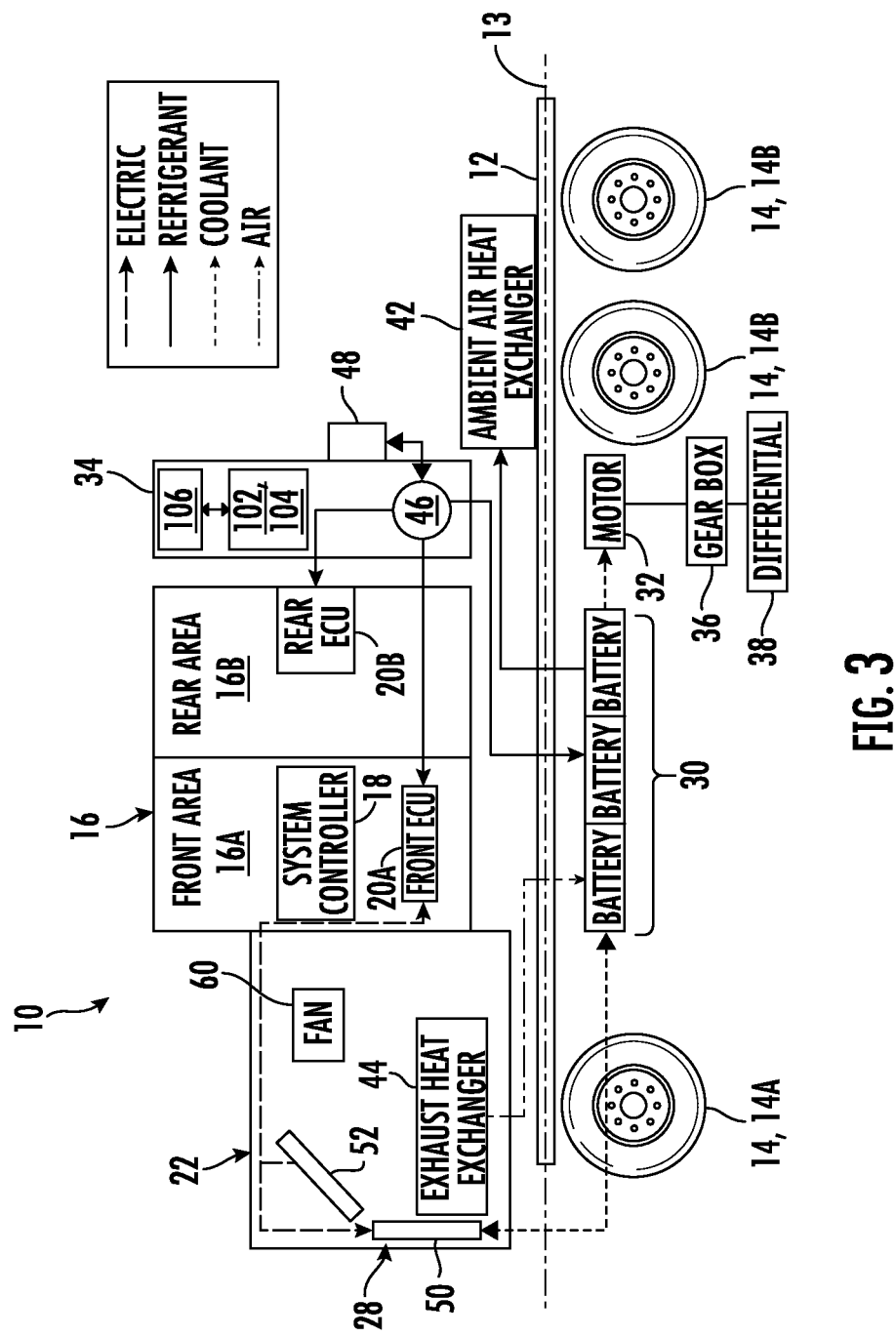
FIG. 3 illustrates a schematic diagram of an embodiment of the vehicle depicted in FIGS. 1 and 2.

Referring now to the drawings, FIGS. 1-3 illustrate various views of an embodiment of a wheeled vehicle 10 along a longitudinal axis 13 according to the present disclosure. In particular, FIGS. 1 and 2 depict side and top partial views of the wheeled vehicle 10, respectively, such as a truck or semi-tractor used to pull one or more trailers with cargo. As shown generally in FIGS. 1-3, components of the vehicle 10 may include, but are not limited to, a chassis 12, which may support multiple axles 14, a cab 16, a compartment 22 containing a radiator assembly 28, an engine assembly 100 having one or more closed-cycle engines 102, 104 mounted to the chassis 12 aft of the radiator assembly 28, e.g., outside of the compartment 22, a hood 40 for accessing the compartment 22, an array of energy storage devices 30 (e.g., batteries), and a motor/generator 32 coupled to at least one of the axles 14. Moreover, as shown particularly in FIG. 2, the one or more closed-cycle engines 102, 104 may be fluidly coupled with one or more fuel tanks 106. Furthermore, as shown in FIG. 2, the vehicle 10 may be equipped with one or more power converters 108, 109 coupled to the closed-cycle engines 102, 104 and the array of energy storage devices 30.

In an embodiment, the chassis 12 may be formed with two frame members such as C-channels arranged parallel to each other. Further, in an embodiment, as shown in FIGS. 2 and 3, the axles 14 coupled to the chassis 12 may include a front axle 14A located under the compartment 22 and rear axles 14B and 14C located behind the cab 16.

Moreover, in an embodiment, the compartment 22 includes mounts for supporting the radiator assembly 28. Thus, the radiator assembly 28 may be positioned at the front of the compartment 22 for cooling the closed closed-cycle engines 102, 104. As such, in an embodiment, coolant, such as glycol or some other anti-freeze liquid, may be circulated through the radiator assembly 28 and the closed closed-cycle engines 102, 104 to remove heat from the closed closed-cycle engines 102, 104 and transfer the heat to the ambient air as further described herein.

Referring particularly to FIG. 3, the cab 16 may further include a system controller 18 for monitoring systems on the vehicle 10 and one or more environmental control units (ECU) 20 having air conditioning and heating options. As depicted in FIG. 3, a front area 16A of the cab 16 may have a front ECU 20A for managing cab temperatures and a rear area 16B of the cab 16 may have a rear ECU 20B for managing rear area temperatures. In such embodiments, the front and rear ECUs 20A, 20B may be fluidly coupled to a compressor 46 and a refrigerant heat exchanger 48 as part of an air conditioning system for the cab 16 and a thermal management system for the energy storage devices 30.

In an embodiment, as shown in FIG. 3, the vehicle 10 may further include an ambient air heat exchanger 42 for heat exchange between the energy storage devices 30 and the ambient air and an exhaust heat exchanger 44 for extracting heat from exhaust gases to heat the energy storage devices 30.

Further, as shown in FIGS. 1-3, an array of energy storage devices 30 may be positioned in various locations on the vehicle 10. In some embodiments, as shown, the energy storage devices 30 may be located on the chassis 12. In some embodiments, the energy storage devices 30 may be located between, under, or around the rails of the chassis 12. Moreover, in an embodiment, the array of energy storage devices 30 may be connected in series, parallel or some combination. Thus, in an embodiment, electric power generated by the generator 26 may be used to charge the array of energy storage devices 30.

Referring to FIGS. 2 and 3, the motor/generator 32 may be coupled to at least one of the axles 14. For example, in some embodiments, the motor/generator 32 may be integrated with one of the axles 14 as an e-axle configuration or located in a hub of a wheel coupled to one of the axles 14 as a hub motor/generator configuration. Moreover, embodiments of the vehicle 10 may include the motor/generator 32 coupled to gearboxes or differentials. For example, as depicted in FIG. 3, the motor/generator 32 may be coupled to a three-speed centralized gearbox 36 with a two-speed rear differential 38 to provide six discrete gear ratios. In some embodiments, the vehicle 10 may be configured with a plurality of motor/generators 32, with a motor/generator 32 coupled to each wheel or pair of wheels. Moreover, as shown in FIGS. 2 and 3, behind the cab 16, the rear pack 34 may be configured to hold one or more fuel tanks 106 for use by closed closed-cycle engines 102, 104.

The vehicle 10 may also include a fan 60 positioned aft of the first and second radiators 50, 52 and forward of the closed-cycle engines 102, 104 so as to draw air into the first and second radiators 50, 52 and down to the ground 74. For example, in an embodiment, the fan 60 is configured to draw the incoming airflow 56 through the grille 64, across the first radiator 50, across the second radiator 52, and then out of the vehicle 10 directly to the ground 74.

Figure 4:
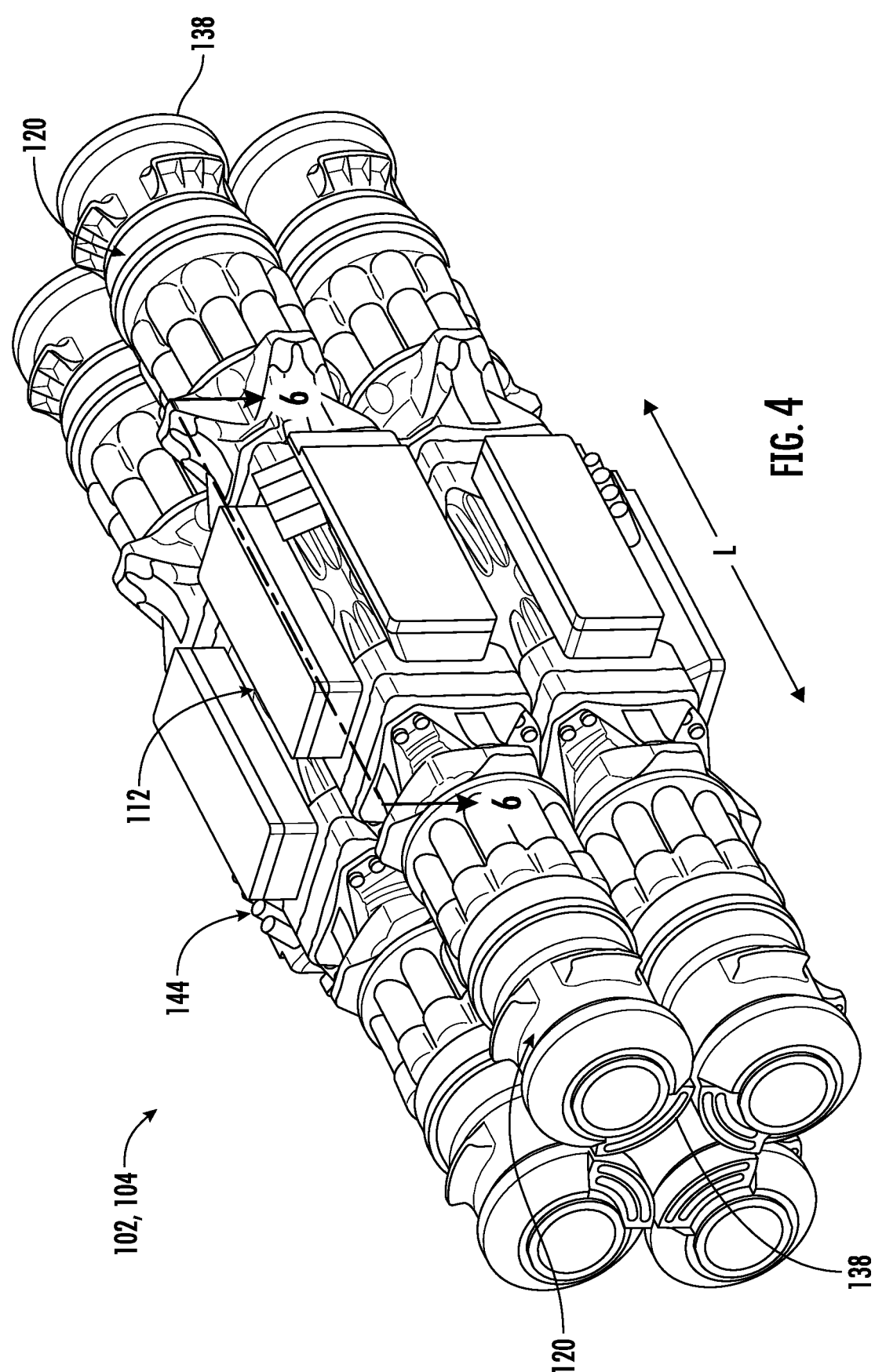
FIG. 4 illustrates a perspective view of an embodiment of a closed-cycle engine for a vehicle according to the present disclosure.
Figure 5:
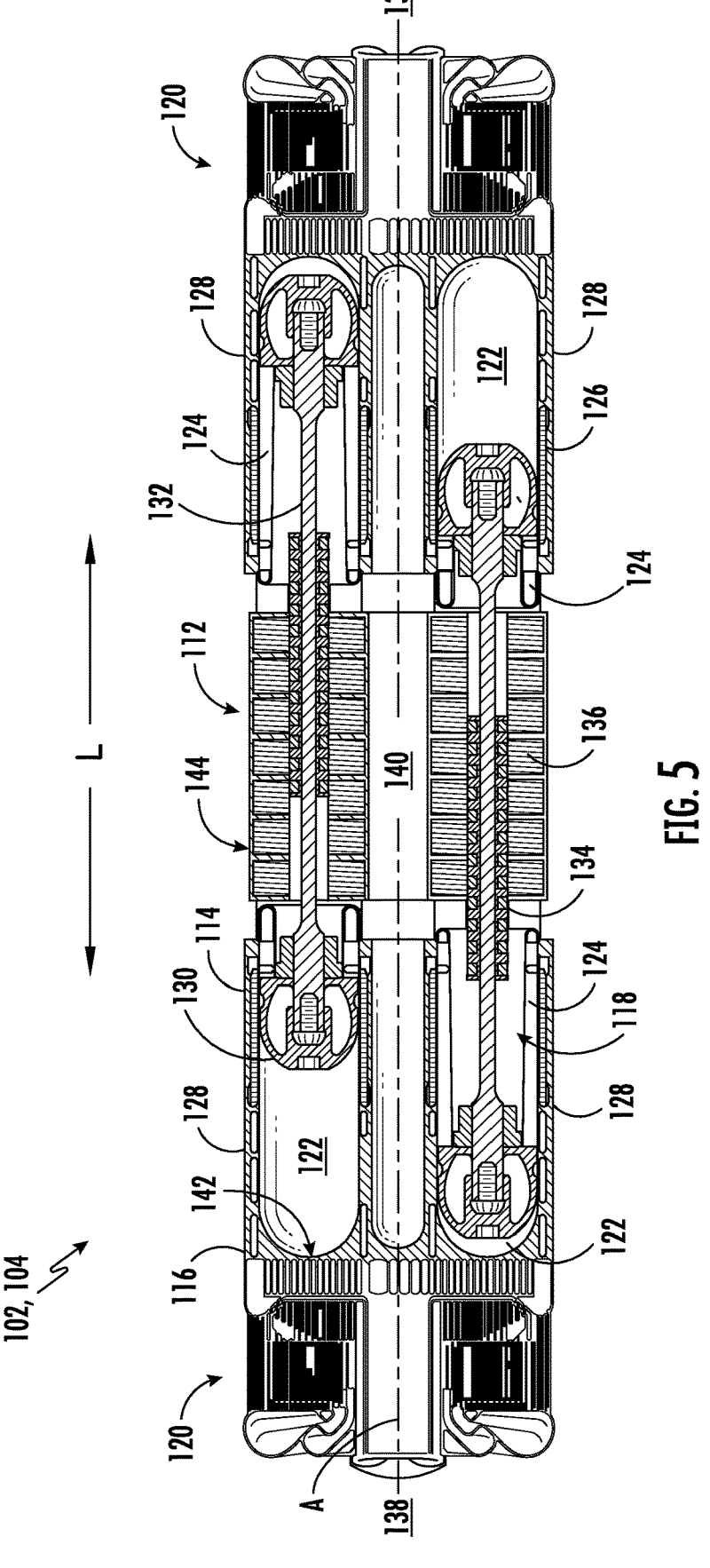
FIG. 5 illustrates a cross-sectional view of an embodiment of one of the closed-cycle engines according to the present disclosure.

Referring now to FIGS. 4 and 5, various views of an embodiment of one of the closed-cycle engines 102, 104 along longitudinal axis A and operably coupled to a load device 112 are illustrated according to the present disclosure. FIG. 4 illustrates a perspective view of an embodiment of one of the closed-cycle engines 102, 104 according to the present disclosure. FIG. 5 illustrates a cross-sectional view of an embodiment of one of the closed-cycle engines 102, 104 according to the present disclosure. As shown in FIG. 5, in an embodiment, the closed-cycle engine 102, 104 contains a substantially fixed mass of an engine working fluid to which and from which thermal energy is exchanged at a respective cold side heat exchanger 114 and a hot side heat exchanger 116. In an embodiment, the engine working fluid is helium. In other embodiments, the engine working fluid may include air, nitrogen, hydrogen, helium, or any appropriate compressible fluid, or combinations thereof.

In still various embodiments, any suitable engine working fluid may be utilized in accordance with the present disclosure. In exemplary embodiments, the engine working fluid may include a gas, such as an inert gas. For example, a noble gas, such as helium may be utilized as the engine working fluid. Exemplary working fluids preferably are inert, such that they generally do not participate in chemical reactions such as oxidation within the environment of the closed-cycle engine 102, 104. Exemplary noble gasses include monoatomic gases such as helium, neon, argon, krypton, or xenon, as well as combinations of these. In some embodiments, the engine working fluid may include air, oxygen, nitrogen, or carbon dioxide, as well as combinations of these. In still various embodiments, the engine working fluid may be liquid fluids of one or more elements described herein, or combinations thereof. It should further be appreciated that various embodiments of the engine working fluid may include particles or other substances as appropriate for the engine working fluid.

In various embodiments, the load device 112 is a mechanical work device or an electric machine. In an embodiment, the load device 112 is a pump, compressor, or other work device. In another embodiment, the load device 112 as an electric machine is configured as a generator producing electric energy from movement of a piston assembly 118 at the closed-cycle engine 102, 104. In still another embodiment, the electric machine is configured as a motor providing motive force to move or actuate the piston assembly 118, such as to provide initial movement (e.g., a starter motor). In still various embodiments, the electric machine defines a motor and generator or other electric machine apparatus such as described further herein.

A heater body 120 is thermally coupled to the closed-cycle engine 102, 104. The heater body 120 may generally define any apparatus for producing or otherwise providing a heating working fluid such as to provide thermal energy to the engine working fluid. Various embodiments of the heater body 120 are further provided herein. Exemplary heater bodies 120 may include, but are not limited to, a combustion or detonation assembly, an electric heater, a nuclear energy source, a renewable energy source such as solar power, a fuel cell, a heat recovery system, or as a bottoming cycle to another system. Exemplary heater bodies 120 at which a heat recovery system may be defined include, but are not limited to, industrial waste heat generally, gas or steam turbine waste heat, nuclear waste heat, geothermal energy, decomposition of agricultural or animal waste, molten earth or metal or steel mill gases, industrial drying systems generally or kilns, or fuel cells. In an embodiment, the heater body 120 providing thermal energy to the engine working fluid may include all or part of a combined heat and power cycle, or cogeneration system, or power generation system generally.

In still various embodiments, the heater body 120 is configured to provide thermal energy to the engine working fluid via a heating working fluid. The heating working fluid may be based, at least in part, on heat and liquid, gaseous, or other fluid provided by one or more fuel sources and oxidizer sources providing a fuel and oxidizer. In various embodiments, the fuel includes, but is not limited to, hydrocarbons and hydrocarbon mixtures generally, "wet" gases including a portion of liquid (e.g., humid gas saturated with liquid vapor, multiphase flow with approximately 10% liquid and approximately 90% gas, natural gas mixed with oil, or other liquid and gas combinations, etc.), petroleum or oil (e.g., Arabian Extra Light Crude Oil, Arabian Super Light, Light Crude Oil, Medium Crude Oil, Heavy Crude Oil, Heavy Fuel Oil, etc.), natural gas (e.g., including sour gas), biodiesel condensate or natural gas liquids (e.g., including liquid natural gas (LNG)), dimethyl ether (DME), distillate oil #2 (DO2), ethane (C$_2$), methane, high H$_2$ fuels, fuels including hydrogen blends (e.g., propane, butane, liquefied petroleum gas, naphtha, etc.), diesel, kerosene (e.g., jet fuel, such as, but not limited to, Jet A, Jet A-1, JP1, etc.), alcohols (e.g., methanol, ethanol, etc.), synthesis gas, coke over gas, landfill gases, etc., or combinations thereof.

In various embodiments, as shown in FIG. 5, the hot side heat exchanger 116 outputs thermal energy to the engine working fluid at an expansion chamber 122 of the closed-cycle engine 102, 104. The hot side heat exchanger 116 is positioned at the expansion chamber 122 of the engine in thermal communication with the heater body 120. In other embodiments, the hot side heat exchanger 116 may be separate from the heater body 120, such that the heating working fluid is provided in thermal communication, or additionally, in fluid communication with the hot side heat exchanger 116. In particular embodiments, the hot side heat exchanger 116 is positioned in direct thermal communication with the heater body 120 and the expansion chamber 122 of the engine 102, 104 such as to receive thermal energy from the heater body 120 and provide thermal energy to the engine working fluid within the closed-cycle engine 102, 104.

In still various embodiments, the heater body 120 may include a single thermal energy output source to a single expansion chamber 122 of the engine. As such, the closed-cycle engine 102, 104 may include a plurality of heater assemblies each providing thermal energy to the engine working fluid at each expansion chamber 122. In other embodiments, such as depicted in regard to FIG. 4, the heater body 120 may provide thermal energy to a plurality of expansion chambers 122 of the closed-cycle engine 102, 104.

The closed-cycle engine 102, 104 further includes a chiller assembly, such as chiller assembly 126 further described herein. The chiller assembly 126 is configured to receive and displace thermal energy from a compression chamber 124 of the closed-cycle engine 102, 104. Further, in an embodiment, the cold side heat exchanger 114 is thermally coupled to the compression chamber 124 of the closed cycle engine 102, 104 and the chiller assembly 126. In one embodiment, the cold side heat exchanger 114 and a piston body 128 defining the compression chamber 124 of the closed-cycle engine 102, 104 are together defined as an integral, unitary structure. In still various embodiments, the cold side heat exchanger 114, at least a portion of the piston body 128 defining the compression chamber 124, and at least a portion of the chiller assembly 126 together define an integral, unitary structure.

In various embodiments, as shown in FIG. 5, the chiller assembly 126 is a bottoming cycle to the closed-cycle engine 102, 104. As such, the chiller assembly 126 is configured to receive thermal energy from the closed-cycle engine 102, 104. The thermal energy received at the chiller assembly 126, such as through a cold side heat exchanger 114, or a cold side heat exchanger 114 further herein, from the closed-cycle engine 102, 104 is added to a chiller working fluid at the chiller assembly 126. In various embodiments, the chiller assembly 126 defines a Rankine cycle system through which the chiller working fluid flows in closed loop arrangement with a compressor. In some embodiments, the chiller working fluid is further in closed loop arrangement with an expander. In various embodiments, the cold side heat exchanger 114 may include a condenser or radiator. The cold side heat exchanger 114 is positioned downstream of the compressor and upstream of the expander and in thermal communication with the compression chamber 124 of the closed-cycle engine 102, 104. In various embodiments, the cold side heat exchanger 114 may generally define an evaporator receiving thermal energy from the closed-cycle engine 102, 104.

Various embodiments of the closed-cycle engine 102, 104 include control systems and methods of controlling various sub-systems disclosed herein, such as, but not limited to, the fuel source, the oxidizer source, the cooling fluid source, the heater body 120, the chiller assembly 126, and the load device 112, including any flow rates, pressures, temperatures, loads, discharges, frequencies, amplitudes, or other suitable control properties associated with the closed-cycle engine 102, 104.

In an embodiment, the control system can control the closed-cycle engine 102, 104 and its associated balance of plant to generate a temperature differential, such as a temperature differential at the engine working fluid relative to the heating working fluid and the chiller working fluid. Thus, the closed-cycle engine 102, 104 defines a hot side, such as at the expansion chamber 122, and a cold side, such as at the compression chamber 124. The temperature differential causes free piston assemblies 118 to move within their respective piston chambers defined at respective piston bodies 128. The movement of pistons 130 within the respective piston bodies 128 causes the electric machine to generate electrical power. The generated electrical power can be provided to the energy storage devices 30 for charging thereof. The control system monitors one or more operating parameters associated with the closed-cycle engine 102, 104, such as piston movement (e.g., amplitude and position), as well as one or more operating parameters associated with the electric machine, such as voltage or electric current. Based on such parameters, the control system generates control commands that are provided to one or more controllable devices of the closed-cycle engine 102, 104. The controllable devices execute control actions in accordance with the control commands. Accordingly, the desired output of the closed-cycle engine 102, 104 can be achieved.

Referring still to FIG. 5, each piston assembly 118 is positioned within a volume or piston chamber defined by a wall defining the piston body 128. The volume within the piston body 128 is separated into a first chamber, or hot chamber, or expansion chamber 122 and a second chamber, or cold chamber (relative to the hot chamber), or compression chamber 124 by a piston 130 of the piston assembly 118. The expansion chamber 122 is positioned thermally proximal to the heater body 120 relative to the compression chamber 124 thermally distal to the heater body 120. The compression chamber 124 is positioned thermally proximal to the chiller assembly 126 relative to the expansion chamber 122 thermally distal to the chiller assembly 126.

In various embodiments, the piston assembly 118 defines a double-ended piston assembly 118 in which a pair of pistons 130 is each coupled to a connection member 132. The connection member 132 may generally define a rigid shaft or rod extended along a direction of motion of the piston assembly 118. In other embodiments, the connection members 132 includes one or more springs or spring assemblies, such as further provided herein, providing flexible or non-rigid movement of the connection member 132. In still other embodiments, the connection member 132 may further define substantially U- or V-connections between the pair of pistons 130.

Each piston 130 is positioned within the piston body 128 such as to define the expansion chamber 122 and the compression chamber 124 within the volume of the piston body 128. The load device 112 is operably coupled to the piston assembly 118 such as to extract energy therefrom, provide energy thereto, or both. The load device 112 defining an electric machine is in magnetic communication with the closed closed-cycle engine 102, 104 via the connection member 132. In various embodiments, the piston assembly 118 includes a dynamic member 134 positioned in operable communication with a stator assembly 136 of the electric machine. The stator assembly 136 may generally include a magnet array 205 or carrier for supporting one or more magnets 209 (FIG. 6) and a plurality of windings 207 wrapped circumferentially relative to the piston assembly 118 and extended along a lateral direction L. In an embodiment, such as depicted in regard to FIG. 4, the dynamic member 134 is connected to the connection member 132. The electric machine may further be positioned between the pair of pistons 130 of each piston assembly 118. Dynamic motion of the piston assembly 118 generates electricity at the electric machine. For example, linear motion of the dynamic member 134 between each pair of chambers defined by each piston 130 of the piston assembly 118 generates electricity via the magnetic communication with the stator assembly 136 surrounding the dynamic member 134.

Referring still to FIG. 5, in various embodiments, the hot side heat exchanger 116 may further define at least a portion of the expansion chamber 122. In an embodiment, such as further described herein, the hot side heat exchanger 116 defines a unitary or monolithic structure with at least a portion of the piston body 128, such as to define at least a portion of the expansion chamber 122. In some embodiments, the heater body 120 further defines at least a portion of the hot side heat exchanger 116, such as to define a unitary or monolithic structure with the hot side heat exchanger 116, such as further described herein.

Furthermore, as shown in FIGS. 4 and 5, the closed-cycle engine 102, 104 defines an outer end 138 and an inner end 140 (FIG. 5) each relative to a lateral direction L. The outer ends 138 define laterally distal ends of the closed-cycle engine 102, 104 and the inner ends 140 define laterally inward or central positions of the closed-cycle engine 102, 104. In one embodiment, such as depicted in regard to FIG. 5, the heater body 120 is positioned at outer ends 138 of the closed-cycle engine 102, 104. The piston body 128 includes a dome structure 142 at the expansion chamber 122. The expansion chamber dome structure 142 provides reduced surface area heat losses across the outer end 138 of the expansion chamber 122. In various embodiments, the pistons 130 of the piston assembly 118 further include domed pistons 130 corresponding to the expansion chamber 122 dome. The dome structure 142, the domed piston 130, or both may provide higher compressions ratios at the chambers 122, 124, such as to improve power density and output.

In various embodiments, such as depicted in regard to FIG. 5, the load device 112 is positioned at the inner end 140 of the closed-cycle engine 102, 104 between laterally opposing pistons 130. The load device 112 may further include a machine body 144 positioned laterally between the piston bodies 128. The machine body 144 surrounds and houses the stator assembly 136 of the load device 112 defining the electric machine. The machine body 144 further surrounds the dynamic member 134 of the electric machine attached to the connection member 132 of the piston assembly 118.

Figure 6:
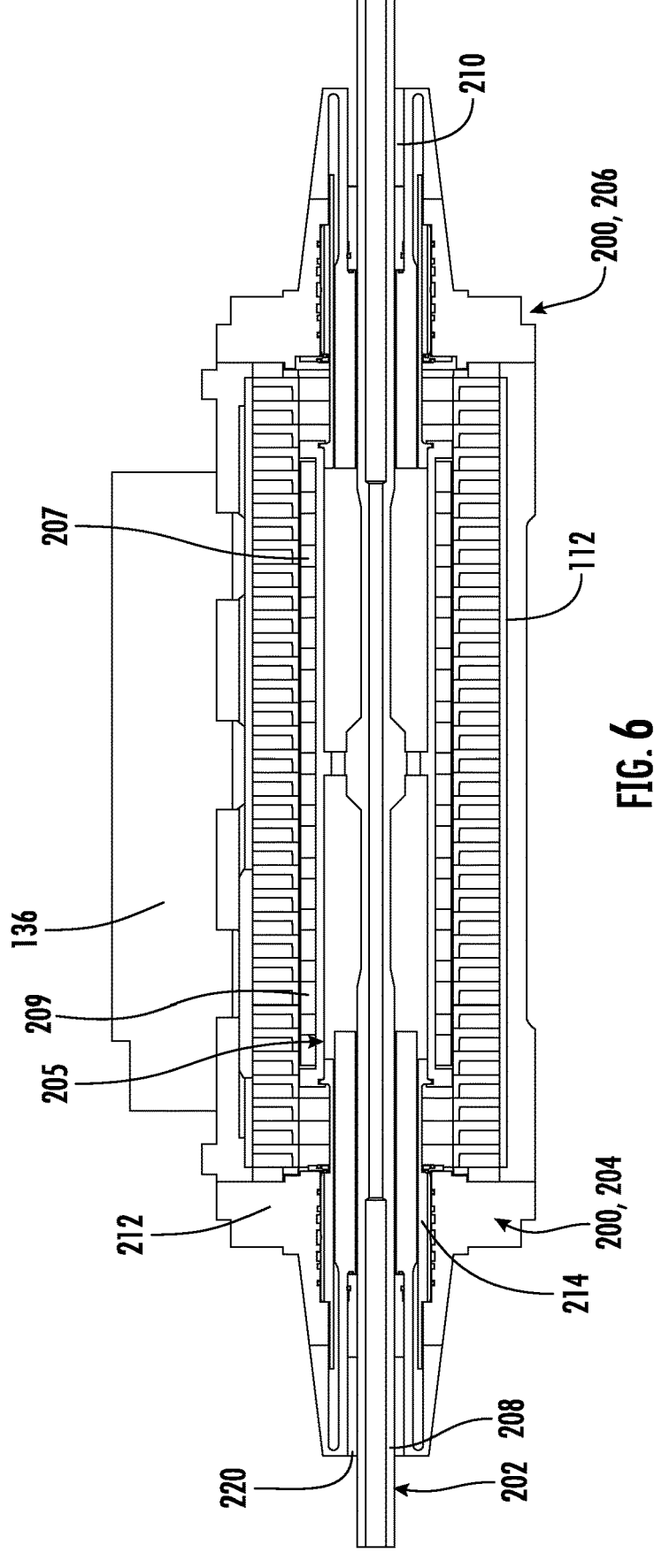
FIG. 6 illustrates a cross-sectional view of a portion of the closed-cycle engine illustrated in FIG. 4 along section line 6-6 according to the present disclosure.
Figure 7:
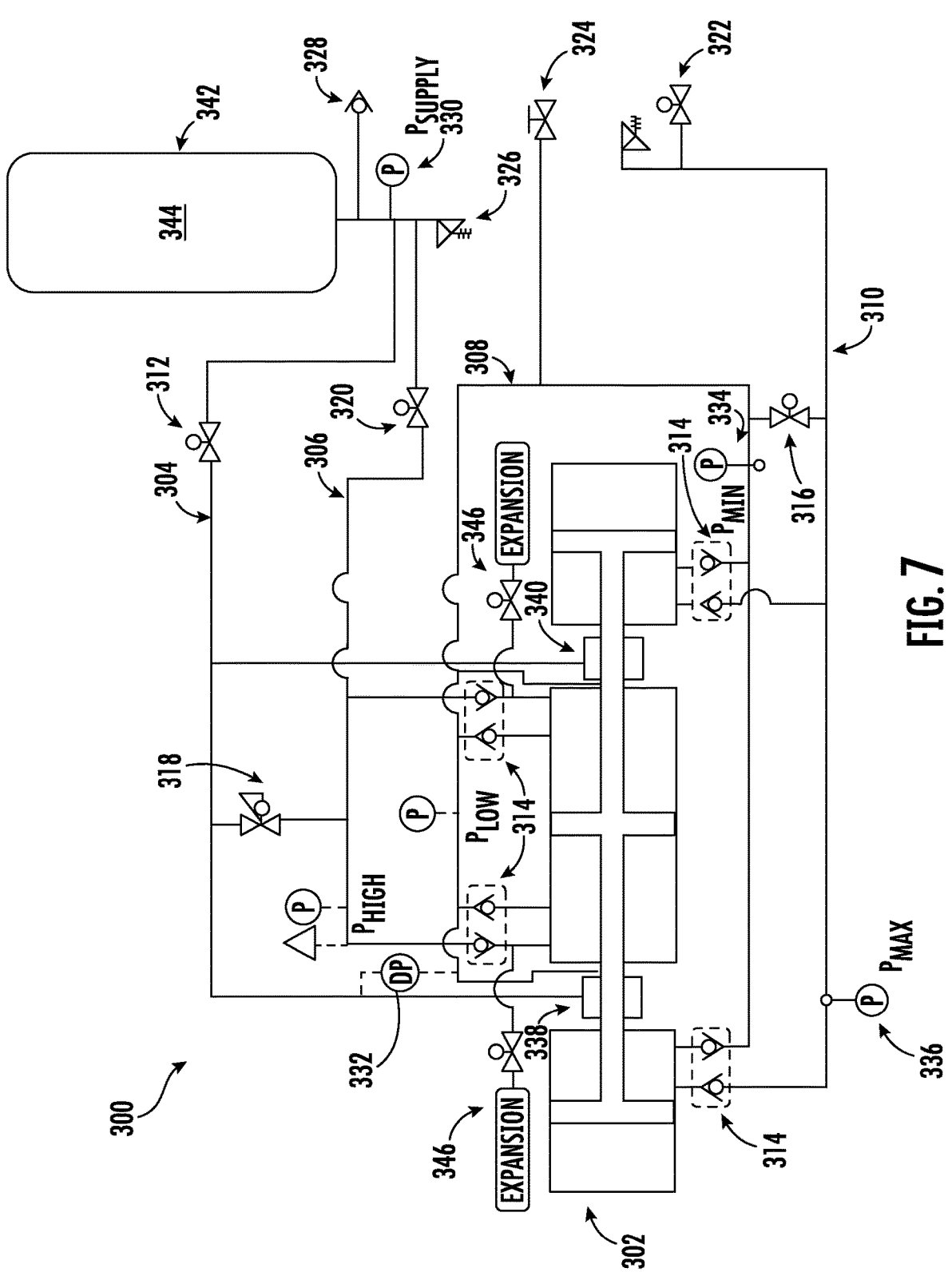
FIG. 7 illustrates a schematic diagram of an embodiment of a pressure control system of a closed-cycle engine according to the present disclosure.

Referring now to FIGS. 6-14B, various views of an embodiment of the closed-cycle engine(s) 102, 104 having a bearing assembly 200 according to the present disclosure are illustrated. FIG. 6 illustrates a cross-sectional view of a portion of the closed-cycle engine 102, 104 illustrated in FIG. 4 along section line 6-6 according to the present disclosure. FIG. 7 illustrates a schematic diagram of a pressure control system for the closed-cycle engine(s) 102, 104 that can be incorporated into the vehicle 10 according to the present disclosure.

Referring particularly to FIG. 6, the closed-cycle engine 102, 104 includes a shaft 202 for driving one of the piston assemblies 118 (not shown in FIG. 6) described herein. Moreover, as shown, the closed-cycle engine 102, 104 includes the stator assembly 136 supporting the shaft 202 and housing the load device 112. Thus, as shown, the bearing assembly 200 is configured to support an end of the shaft 202. More specifically, as shown in FIG. 6, a first bearing assembly 204 may support a forward end 208 of the shaft 202 and a second bearing assembly 206 may support an aft end 210 of the shaft 202.

Moreover, in an embodiment, as shown in FIG. 6, the bearing assembly 200 may include a bearing housing 212 and a fluid bearing 214 within the bearing housing 212. Thus, in an embodiment, the fluid bearing 214 described herein may be a forward bearing, an aft bearing, or both of the closed-cycle engine 102, 104. Furthermore, as shown, the bearing housing 212 includes an opening 220 for receiving the shaft 202 therethrough.

Referring particularly to FIG. 7, a schematic diagram of an embodiment of a pressure control system 300 for the closed-cycle engine(s) 102, 104 that can be incorporated into the vehicle 10 according to the present disclosure is illustrated. In particular, as shown, the pressure control system 300 includes a plurality of cylinder-piston assemblies 302, only one of which is shown. Moreover, as shown, the pressure control system 300 includes a network of fluid passageways 304, 306, 308, 310 and a plurality of valves (or vents) 312, 314, 316, 318, 320, 322, 324 in fluid communication with the network of fluid passageways 304, 306, 308, 310. For example, as shown, the plurality of valves 312, 314, 316, 318, 320, 322, 324 may include, at least, one or more check valves 314, a bearing boost control valve 312, a return to tank solenoid valve 320, a bearing delta pressure (dP) control valve 318, one or more regulator valves, one or more vent valves, and/or one or more service valves 324. In addition, as shown, the pressure control system 300 may also include one or more solenoid valves, overpressure safety devices 326, filters, etc. Moreover, in an embodiment, the pressure control system 300 may include one or more fill or vent ports 328.

Moreover, as shown, the pressure control system 300 may further include various pressure sensors for monitoring pressure throughout the pressure control system 300. For example, as shown in FIG. 7, the pressure control system 300 may include a supply pressure sensor 330, a dP bearing pressure sensor 332, a $P_{MIN}$ pressure sensor 334, and/or a $P_{MAX}$ pressure sensor 336.

In addition, as shown, the pressure control system 300 includes one or more fluid bearings 338, 340 associated with each of the plurality of cylinder-piston assemblies 302. Accordingly, as shown, the fluid bearings 338, 340 are in fluid communication with the network of fluid passageways 304, 306, 308, 310.

Still referring to FIG. 7, the pressure control system 300 further includes a pressurized tank 342 containing a working fluid 344, such as helium. Thus, in an embodiment, the pressurized tank 342 may be selectively fluidly coupled with the plurality of cylinder-piston assemblies 302 (and thus the fluid bearings 338, 340) via the network of fluid passageways 304, 306, 308, 310 and the plurality of valves 312, 314, 316, 318, 320, 322, 324.

Furthermore, as shown in FIGS. 8A-14B, various cross-sectional views of a portion of a linear electric machine 400, such as the of the closed-cycle engine 102, 104, are illustrated, particularly illustrating multiple embodiments of a piston assembly according to the present disclosure. More specifically, as shown, the linear electric machine 400 includes the shaft 202 described herein, a primary piston assembly (corresponding to one of the piston assemblies 118 described herein and illustrated in FIG. 5), the stator assembly 136 supporting the shaft 202 (not shown in FIGS. 8A-14B), and the bearing assembly 200 supporting an end of the shaft 202. In addition, as shown, the linear electric machine 400 includes a secondary piston assembly 404 formed integrally with the shaft 202 and at least a portion of the bearing assembly 200 for providing fluid to the bearing assembly 200.

In certain embodiments, as shown in FIGS. 8A-14B, the secondary piston assembly 404 may include a pump chamber 406 and a piston member 408. In such embodiments, the piston member 408 is in operable communication with the pump chamber 406. Moreover, as shown, the pump chamber 406 is formed integrally with the shaft 202 and/or the bearing housing 212.

In addition, as shown and previously mentioned, the linear electric machine 400 may further include one or more check valves 314 (FIG. 7) for controlling fluid flow into and out of the linear electric machine 400 (and therefore the secondary piston assembly 404). Moreover, in an embodiment, as shown in FIG. 7, the linear electric machine 400 may include at least one expansion valve 346 for enabling a variable compression ratio for the secondary piston assembly 404. For example, as shown, the linear electric machine 400 includes an expansion valve 346 for each piston assembly 302. In an embodiment, for example, the expansion valve may be a solenoid valve. Accordingly, in an embodiment, for normal operation, the expansion volumes provided by the expansion valve(s) 346 add dead volume to the secondary piston assembly 404, lowering its compression ratio. When the expansion volumes are isolated, this dead volume is removed, increasing the compression ratio of the secondary piston assembly 404. In such embodiments, by having a variable compression ratio, the loss associated with driving the secondary piston assembly 404 with the load device 112 is minimized.

Figures 8A, 8B:
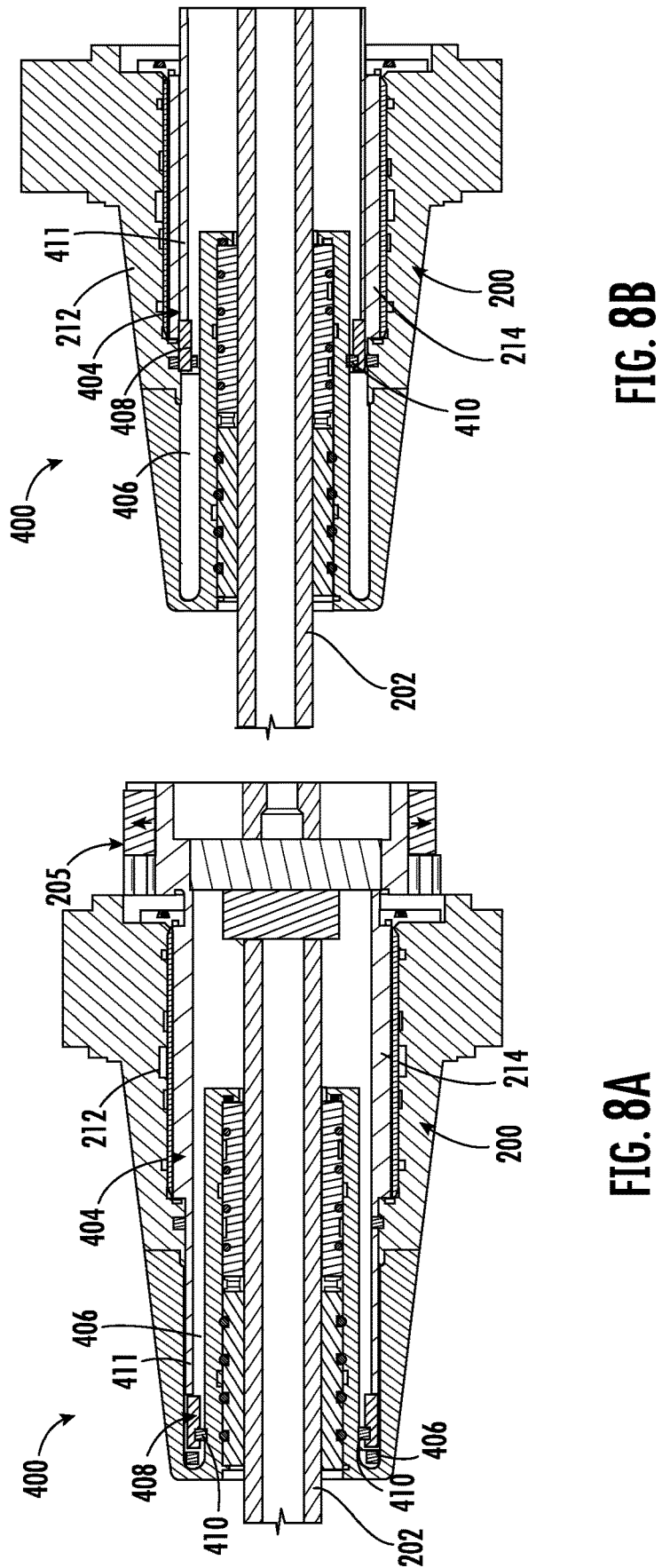
FIGS. 8A and 8B illustrate cross-sectional views of an embodiment of a portion of a closed-cycle engine according to the present disclosure.

In an embodiment, for example, FIG. 8A illustrates a cross-sectional view of an embodiment of a portion of the linear electric machine 400 according to the present disclosure, particularly illustrating the secondary piston assembly 404 in a discharge position. FIG. 8B illustrates a cross-sectional view of an embodiment of a portion of the linear electric machine 400 according to the present disclosure, particularly illustrating the secondary piston assembly 404 in a suction position. Thus, as shown in FIG. 8A, the piston member 408 corresponds to an extension member 411 of the magnet carrier 205. Accordingly, as shown, the extension member 411 is configured to engage with the pump chamber 406 (e.g. is pumped into the pump chamber 406) to create a high pressure region in the pump chamber 406. Further, as shown in FIG. 8B, the piston member 408 disengages with the pump chamber 406 (i.e., moves out of the pump chamber 406) to create a low pressure region in the pump chamber 406. In such embodiments, as shown, the piston member 408 may also include one or more seals 410 for sealing the pump chamber 406 as the piston member 408 engages with the pump chamber 406 to create the low and high pressure regions. More specifically, as shown, the secondary piston assembly 404 may include one or more seals 410 arranged with an end of the extension member 411. Furthermore, and still referring to FIG. 8A, the extension member 411 of the magnet carrier 205 extends radially interior of the bearing assembly 200.

Figure 9:
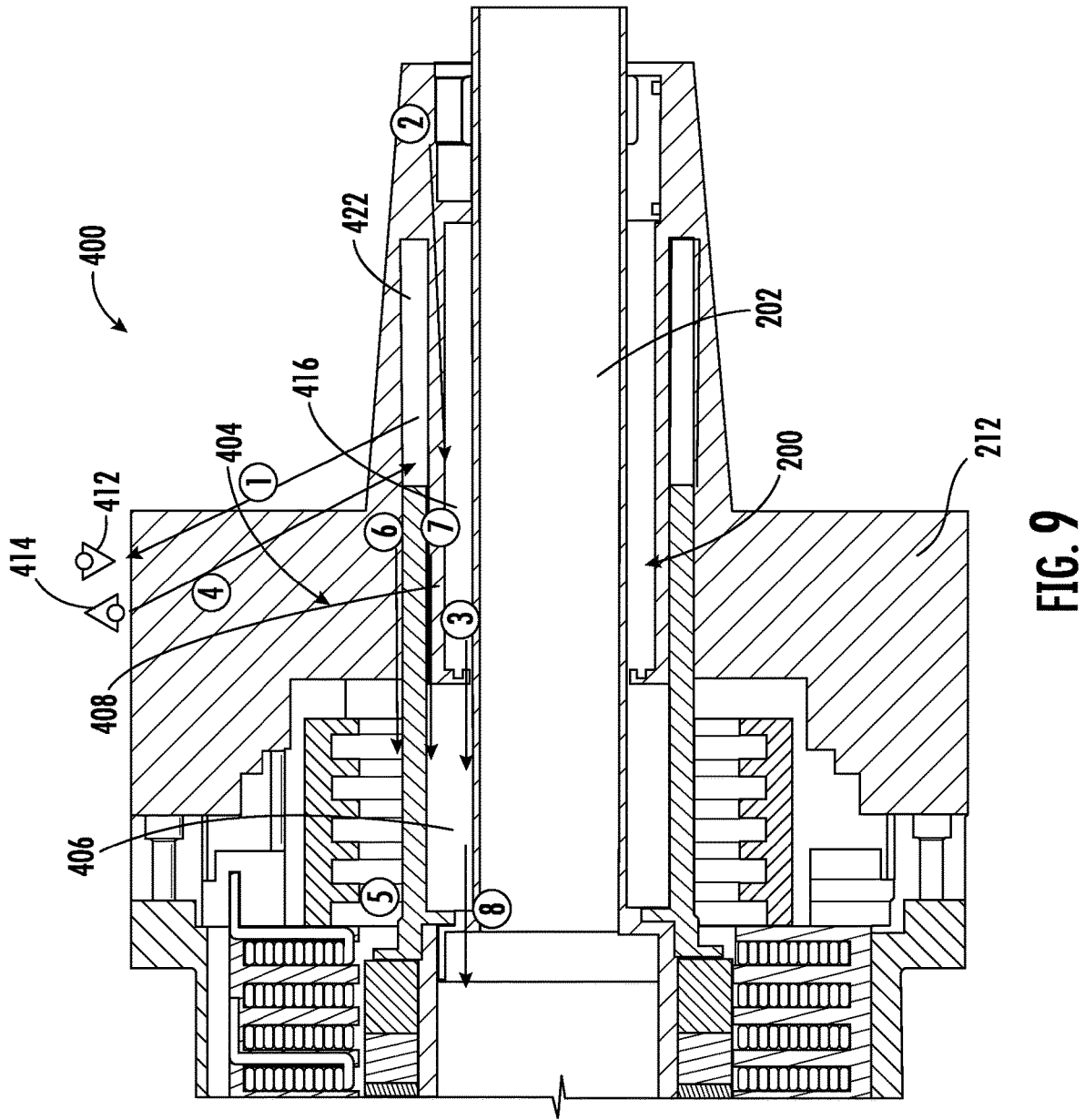
FIG. 9 illustrates a cross-sectional view of another embodiment of a portion of a closed-cycle engine according to the present disclosure.

In another embodiment, as shown in FIG. 9, a cross-sectional view of another embodiment of a portion of the linear electric machine 400 according to the present disclosure is illustrated. In particular, as shown in the illustrated embodiment and similar to the embodiment of FIGS. 8A and 8B, the piston member 408 corresponds to the extension member 411 of the magnet carrier 205. Thus, as shown, the extension member 411 is configured to pump into and out of the pump chamber 406 that is formed integrally with the bearing housing 212 of the bearing assembly 200. Furthermore, as shown, the piston member 408 includes clearance seals. In an embodiment, for example, the clearance seals generally refer to the tight radial gaps above and below the piston member 408 between the piston member 408 and walls of the pump chamber 406. More particularly, in an embodiment, a seal is created by the large pressure drop in the gap as the piston member 408 moves back and forth in the pump chamber 406.

In particular embodiments, as indicated by arrow (1), a first check valve 412 allows fluid (e.g., air) to be pumped out of the pump chamber 406. As indicated by arrows (2) and (3), the bearing assembly 200 can be supplied with fluid and vented into a vent chamber 416. Moreover, as indicated by arrow (4), the pump chamber 406 can be supplied with fluid via a second check valve 414. Arrow (5) indicates a bypass flow in the gap between the magnet carrier outer diameter (OD) and inner diameter (ID), whereas arrows (6) and (7) indicate leakage flow from the pump clearance seals, which will flow into the vent chamber 416. In addition, arrow (8) indicates fluid flow from the vent chamber 416 to a translator crossover. Furthermore, as shown in FIG. 9, the extension member 411 of the magnet carrier 205 extends radially exterior to the bearing assembly 200.

Figures 10A, 10B:
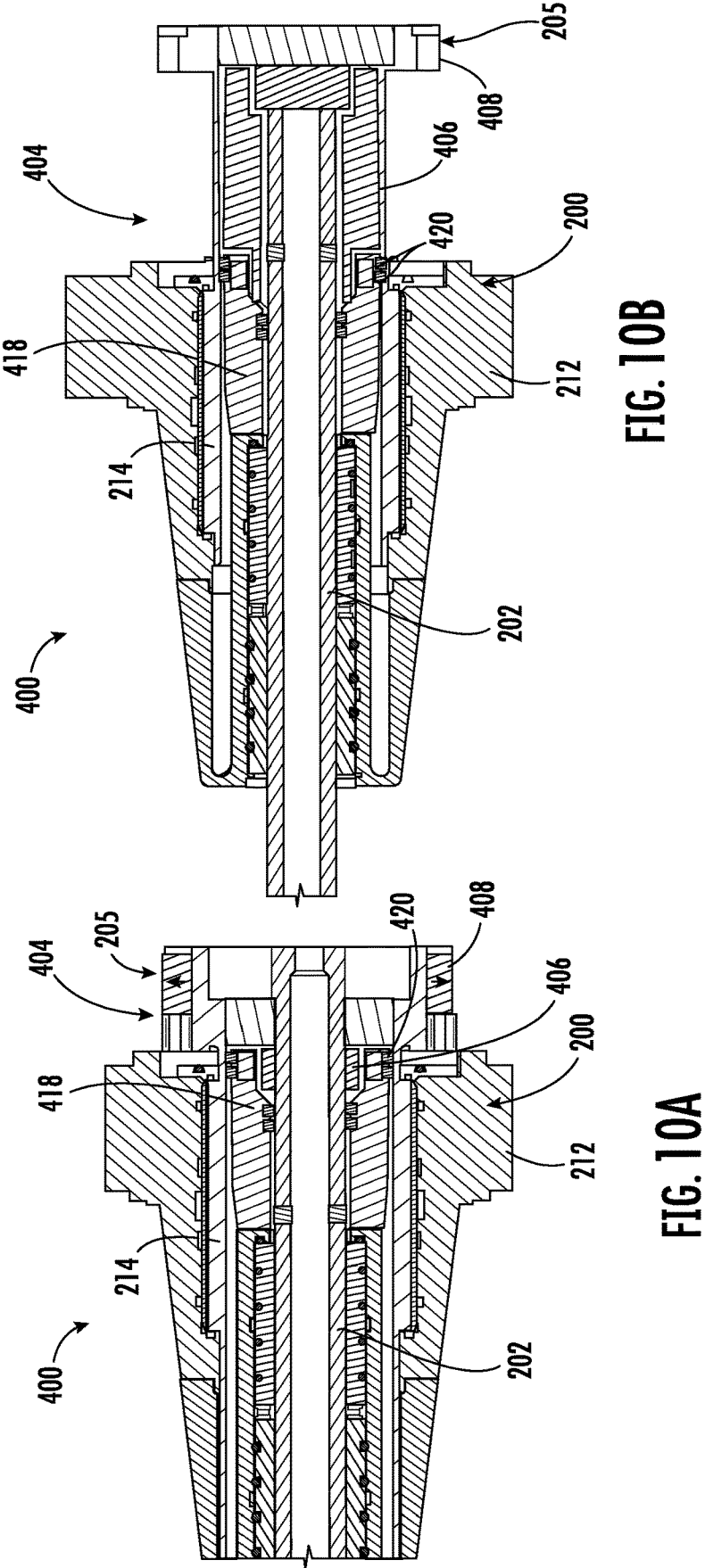
FIGS. 10A and 10B illustrate cross-sectional views of still another embodiment of a portion of a closed-cycle engine according to the present disclosure.

In still another embodiment, as shown in FIGS. 10A and 10B, cross-sectional views of a portion of the linear electric machine 400 according to the present disclosure are illustrated. In particular, as shown in FIGS. 10A-10B, the piston member 408 of the secondary piston assembly 404 corresponds to the magnet carrier 205. Further, as shown in FIG. 10A, the secondary piston assembly 404 is in a discharge position. As shown in FIG. 10B, the secondary piston assembly 404 is in a suction position. Thus, as shown in FIG. 10A, the piston member 408 (which corresponds to the magnet carrier 205) is pumped towards a check valve carrier 418 (which may be part of the bearing housing 212 and/or a separate component attached to the bearing housing 212), which may be part of the secondary piston assembly 404, to create a high pressure region. Accordingly, in such embodiments, the pump chamber 406 is defined by an end of the check valve carrier 418 and the magnet carrier 205. Further, as shown in FIG. 10B, the piston member 408 is pumped away from the check valve carrier 418 to create a low pressure region. In such embodiments, as shown, the linear electric machine 400 may also one or more seals 420 for sealing the pump chamber 406 as the piston member 408 moves to create the low and high pressure regions.

Figure 11:
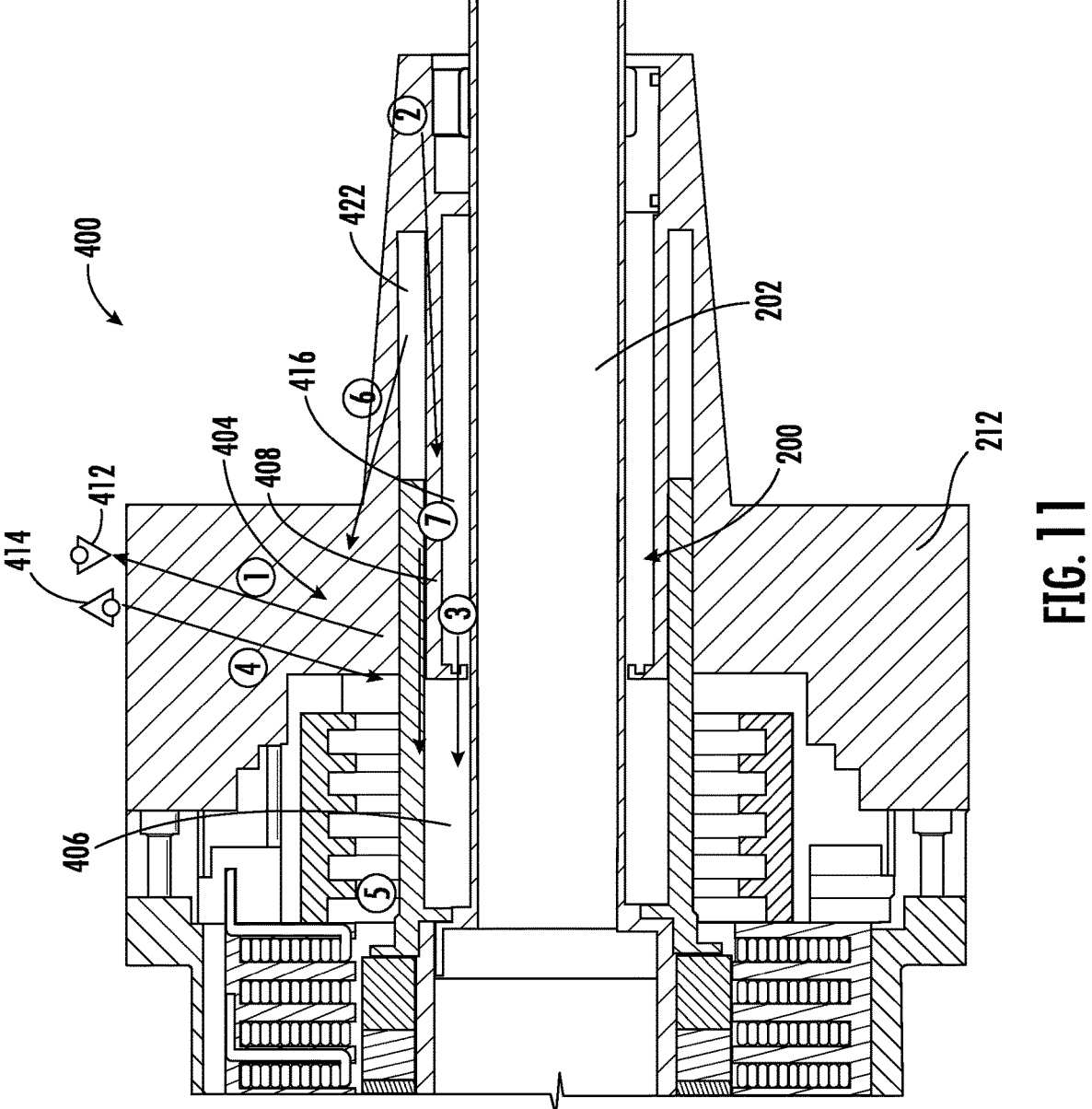
FIG. 11 illustrates a cross-sectional view of yet another embodiment of a portion of a closed-cycle engine according to the present disclosure.

Referring now to FIG. 11, a cross-sectional view of yet another embodiment of a portion of the linear electric machine 400 according to the present disclosure is illustrated. In particular, as shown in the illustrated embodiment, the piston member 408 of the secondary piston assembly 404 pumps into and out of the pump chamber 406 that is formed integrally with the bearing housing 212 of the bearing assembly 200. In contrast to the embodiment of FIG. 9, however, the embodiment of FIG. 11 includes a discourager 422, which generally refers to a clearance seal similar to those described herein. In other words, in an embodiment, the discourager 422 may generally refer to the tight gaps between the extension member/piston member 408 and the walls of the cavity 422 that create a large pressure drop the limit the amount of leakage flow out of the pump chamber 406.

In addition, as shown and previously mentioned, the check valve(s) 412, 414 are configured to control fluid flow into and out of the linear electric machine 400. In particular embodiments, as indicated by arrow (1), the first check valve 412 allows fluid (e.g., air) to be pumped out of the pump chamber 406. As indicated by arrows (2) and (3), the bearing assembly 200 can be supplied with fluid and vented into the vent chamber 416. Moreover, as indicated by arrow (4), the pump chamber 406 can be supplied with fluid via the second check valve 414. Arrow (5) indicates a bypass flow in the gap between the magnet carrier OD and the ID, whereas arrow (6) indicates a discourager pocket vent. In addition, arrow (7) indicates a discourager bypass into the pump chamber 406.

Figures 12A, 12B:
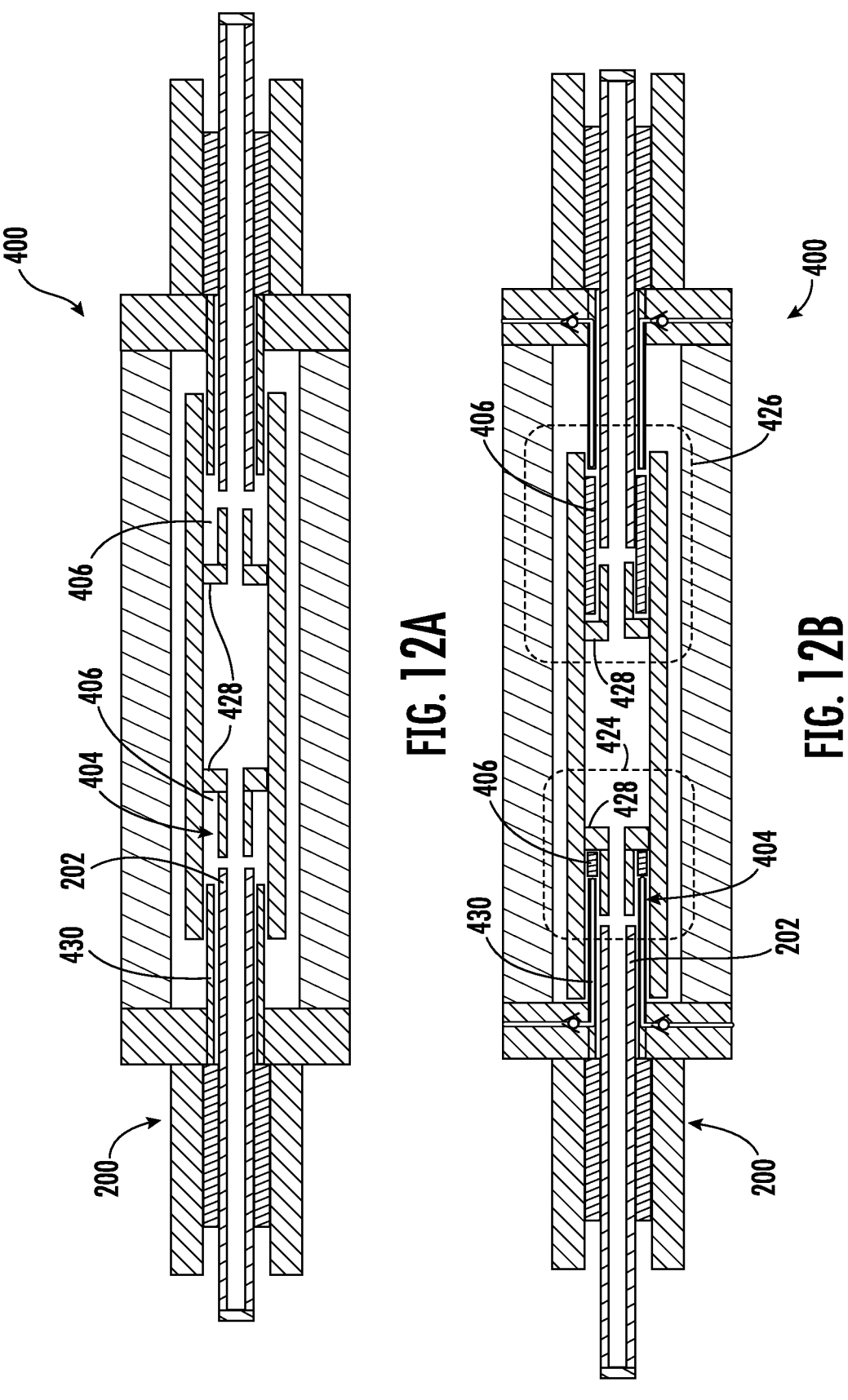
FIGS. 12A and 12B illustrate cross-sectional views of a further embodiment of a portion of a closed-cycle engine according to the present disclosure.

Referring now to FIGS. 12A and 12B, cross-sectional views of a portion of the linear electric machine 400 according to the present disclosure are illustrated. In particular, as shown in FIG. 12A, the secondary piston assembly is in a static or intermediate position. As shown in FIG. 12B, the secondary piston assembly 404 is in a discharge position at the forward end of the machine 400 (as indicated via box 424) and a suction position at the aft end of the machine 400 (as indicated via box 426). Thus, as shown, the piston member 408 generally corresponds to one or more extension arms 430 extending from the bearing assembly 200. Accordingly, the piston member 408 can be pumped forward and aft in a repeated motion against a magnet carrier web 428 to create the high and low pressure regions needed to supply the bearing assembly 200 with fluid. In such embodiments, as shown, the magnet carrier web 428 defines at least a portion of the secondary piston assembly 404. More specifically, as shown, the pump chamber 406 is defined by the magnet carrier web 428 and the extension arm(s) 430 extending from the bearing housing 212.

Figures 13A, 13B:
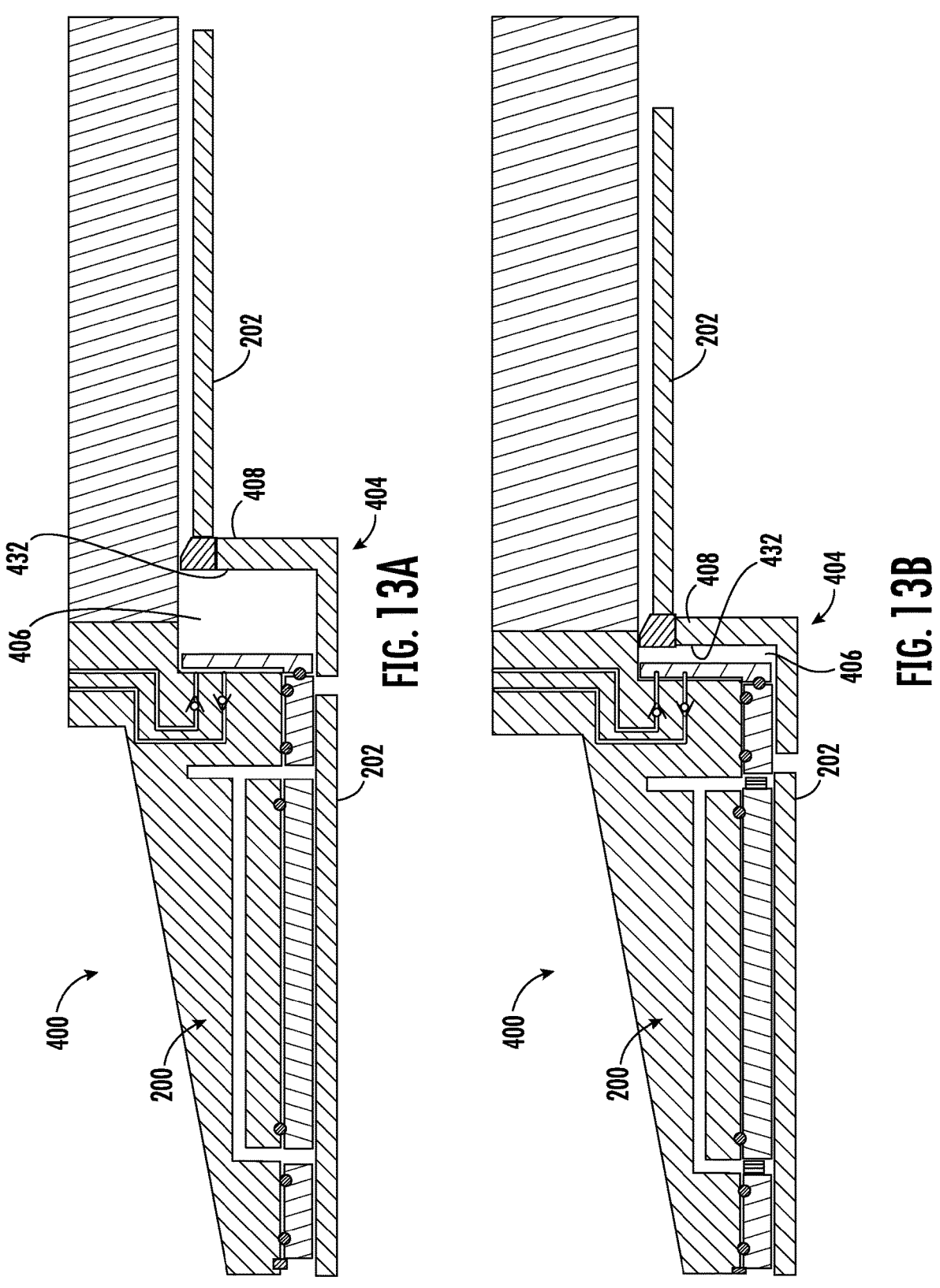
FIGS. 13A and 13B illustrate cross-sectional views of still another embodiment of a portion of a closed-cycle engine according to the present disclosure.

Referring now to FIGS. 13A and 13B, cross-sectional views of still another embodiment of a portion of the linear electric machine 400 according to the present disclosure are illustrated. In particular, as shown in FIG. 13A, the secondary piston assembly 404 is in a suction position. As shown in FIG. 13B, the secondary piston assembly 404 is in a discharge position. Furthermore, as shown, the piston member 408 is part of the shaft 202. Accordingly, the piston member 408 can be pumped forward and aft in a repeated motion against the bearing housing 212 to create the high and low pressure regions needed to supply the bearing assembly 200 with fluid. In such embodiments, as shown, the pump chamber 406 is defined between an end face 432 of the piston member 408 and the bearing housing 212.

Figures 14A, 14B:
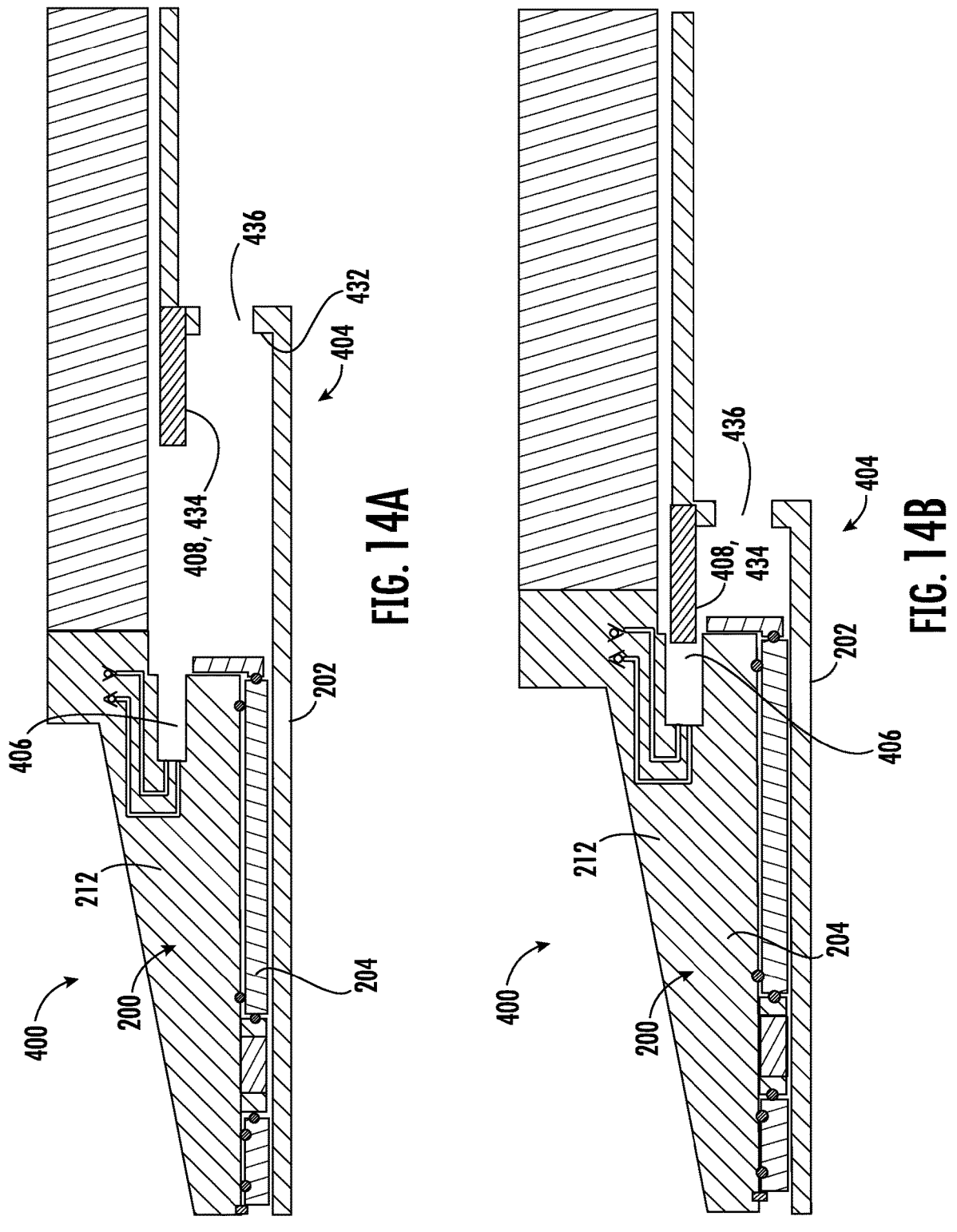
FIGS. 14A and 14B illustrate cross-sectional views of another embodiment of a portion of a closed-cycle engine according to the present disclosure.

Referring now to FIGS. 14A and 14B, cross-sectional views of another embodiment of a portion of the linear electric machine 400 according to the present disclosure are illustrated. In particular, as shown in FIG. 14A, the secondary piston assembly 404 is in a suction position. As shown in FIG. 14B, the secondary piston assembly 404 is in a discharge position. Furthermore, as shown, the piston member 408 is part of the shaft 202. More specifically, as shown, the piston member 408 is integrally formed with the shaft 202 to form an extension member 434 extending along an axial direction of the linear electric machine 400. In addition, as shown, the pump chamber 406 is formed into the bearing housing 212. Accordingly, as shown, the piston member 408 can be pumped forward and aft in a repeated motion into and out of the pump chamber 406 to create the high and low pressure regions needed to supply the bearing assembly 200 with fluid. In addition, as shown, the linear electric machine 400 may include at least one vent 436 formed into the shaft 202 for venting the secondary piston assembly 404.

Further aspects are provided by the subject matter of the following clauses:

A linear electric machine, comprising: a shaft; a primary piston assembly operably coupled with the shaft; a stator assembly supporting the shaft and housing a load device; a bearing assembly supporting an end of the shaft, the bearing assembly comprising a bearing housing and a fluid bearing within the bearing housing, the bearing housing comprising an opening for receiving the shaft therethrough; and a secondary piston assembly formed integrally with the shaft and at least a portion of the bearing assembly for providing fluid to the bearing assembly.

The linear electric machine of any preceding clause, wherein the secondary piston assembly further comprises a pump chamber and a piston member, the piston member in operable communication with the pump chamber, the pump chamber formed integrally with at least one of the shaft or the bearing housing.

The linear electric machine of any preceding clause, wherein the piston member is integrally formed with the shaft to form an extension member extending along an axial direction of the linear electric machine.

The linear electric machine of any preceding clause, wherein the secondary piston assembly further comprises one or more seals arranged with an end of the extension member.

The linear electric machine of any preceding clause, wherein the extension member extends radially interior of the bearing assembly.

The linear electric machine of any preceding clause, wherein the extension member extends radially exterior to the bearing assembly.

The linear electric machine of any preceding clause, wherein the linear electric machine further comprises a magnet carrier web for supporting one or more magnets, the magnet carrier web defining at least a portion of the secondary piston assembly.

The linear electric machine of any preceding clause, wherein secondary piston assembly further comprises a check valve carrier, and wherein the pump chamber is defined by an end of the check valve carrier and the magnet carrier web.

The linear electric machine of any preceding clause, wherein the pump chamber is defined by the magnet carrier web and an extension arm extending from the bearing housing.

The linear electric machine of any preceding clause, further comprising at least one vent formed into the shaft for venting the secondary piston assembly.

The linear electric machine of any preceding clause, further comprising at least one expansion valve for enabling a variable compression ratio for the secondary piston assembly.

The linear electric machine of any preceding clause, wherein the expansion valve is a solenoid valve.

The linear electric machine of any preceding clause, wherein the fluid bearing is one of a forward bearing or an aft bearing of the linear electric machine.

The linear electric machine of any preceding clause, wherein the linear electric machine is a closed-cycle engine.

A piston assembly for a linear electric machine, the piston assembly comprising: a shaft; a primary piston operably coupled with the shaft; a bearing assembly supporting an end of the shaft, the bearing assembly comprising a bearing housing and a fluid bearing within the bearing housing, the bearing housing comprising an opening for receiving the shaft therethrough; and a secondary piston formed integrally with the shaft and at least a portion of the bearing assembly for providing fluid to the bearing assembly.

The piston assembly of any preceding clause, wherein the secondary piston further comprises a pump chamber and a piston member, the piston member in operable communication with the pump chamber, the pump chamber formed integrally with at least one of the shaft or the bearing housing.

The piston assembly of any preceding clause, wherein the piston member is integrally formed with the shaft to form an extension member extending along an axial direction of the linear electric machine.

The piston assembly of any preceding clause, wherein the secondary piston further comprises one or more seals arranged with an end of the extension member.

The piston assembly of any preceding clause, further comprising at least one vent formed into the shaft for venting the secondary piston.

The piston assembly of any preceding clause, further comprising at least one expansion solenoid valve for enabling a variable compression ratio for the secondary piston.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A linear electric machine, comprising:
a shaft;
a primary piston assembly operably coupled with the shaft, the primary piston assembly comprising a primary piston member and a primary pump chamber;
a stator assembly supporting the shaft and housing a load device;
a bearing assembly supporting an end of the shaft, the bearing assembly comprising a bearing housing and a fluid bearing within the bearing housing, the bearing housing comprising an opening for receiving the shaft therethrough; and
a secondary piston assembly disposed axially between the load device and the primary piston member, the secondary piston assembly comprising a secondary piston member in operable communication with a secondary pump chamber,
wherein the secondary pump chamber is formed integrally with at least a portion of the bearing assembly for providing fluid to the bearing assembly, the secondary pump chamber defining a groove extending partially through the bearing housing along an axial direction of the linear electric machine, and
wherein the secondary piston member comprises an extension member extending into the groove along the axial direction.

2. The linear electric machine of claim 1, wherein the secondary piston assembly further comprises one or more seals arranged with an end of the extension member.

3. The linear electric machine of claim 1, wherein the linear electric machine further comprises a magnet carrier web for supporting one or more magnets, the magnet carrier web defining at least a portion of the secondary piston assembly.

4. The linear electric machine of claim 3, wherein the secondary piston assembly further comprises a check valve carrier, and wherein the secondary pump chamber is defined at least in part by an end of the check valve carrier.

5. The linear electric machine of claim 3, wherein the secondary pump chamber is defined at least in part by the magnet carrier web.

6. The linear electric machine of claim 1, further comprising at least one vent formed into the shaft for venting the secondary piston assembly.

7. The linear electric machine of claim 1, further comprising at least one expansion valve for enabling a variable compression ratio for the secondary piston assembly.

8. The linear electric machine of claim 7, wherein the expansion valve is a solenoid valve.

9. The linear electric machine of claim 1, wherein the fluid bearing is one of a forward bearing or an aft bearing of the linear electric machine.

10. The linear electric machine of claim 1, wherein the linear electric machine is a closed-cycle engine.

11. A piston assembly for a linear electric machine, the piston assembly comprising:
a shaft;
a primary piston assembly operably coupled with the shaft, the primary piston assembly comprising a primary piston member and a primary pump chamber;
a bearing assembly supporting an end of the shaft, the bearing assembly comprising a bearing housing and a fluid bearing within the bearing housing, the bearing housing comprising an opening for receiving the shaft therethrough; and
a secondary piston assembly comprising a secondary piston member in operable communication with a secondary pump chamber, the primary piston member being disposed axially between the primary pump chamber and the secondary piston assembly,
wherein the secondary pump chamber is formed integrally with at least a portion of the bearing assembly for providing fluid to the bearing assembly, the secondary pump chamber defining a groove extending partially through the bearing housing along an axial direction of the piston assembly, and
wherein the secondary piston member comprises an extension member extending into the groove along the axial direction.

12. The piston assembly of claim 11, wherein the secondary piston further comprises one or more seals arranged with an end of the extension member.

13. The piston assembly of claim 11, further comprising at least one vent formed into the shaft for venting the secondary piston.

14. The piston assembly of claim 11, further comprising at least one expansion solenoid valve for enabling a variable compression ratio for the secondary piston.

* * * * *